United States Patent
Ono et al.

(10) Patent No.: US 7,698,043 B2
(45) Date of Patent: Apr. 13, 2010

(54) VEHICLE CONTROL SYSTEM AND VEHICLE CONTROL METHOD

(75) Inventors: Eiichi Ono, Toyota (JP); Yoshikazu Hattori, Nisshin (JP); Yuji Muragishi, Owariasahi (JP)

(73) Assignees: Toyota Jidosha Kabushiki Kaisha, Toyota-shi; Aisin Seiki Kabushiki Kaisha, Kariya-shi; Jtekt Corporation, Chuo-ku; Advics Co., Ltd., Kariya ( * ) Notice: Subject to any disclaimer, the term of this patent is extended or adjusted under 35 U.S.C. 154(b) by 1081 days.

(21) Appl. No.: 11/363,066

(22) Filed: Feb. 28, 2006

(65) Prior Publication Data

US 2006/0217867 A1    Sep. 28, 2006

(30) Foreign Application Priority Data

Mar. 24, 2005    (JP)    ............................. 2005-087350

(51) Int. Cl.
    *B60T 8/175* (2006.01)
(52) U.S. Cl. ........................................ 701/70; 340/429
(58) Field of Classification Search ................... 701/70, 701/72, 73, 80, 83, 84, 90, 41, 58, 48; 303/146, 303/148, 149, 150, 143, 189; 180/408, 410, 180/197; 280/14.106, 5.51
    See application file for complete search history.

(56) References Cited

U.S. PATENT DOCUMENTS

| 6,971,726 | B2 * | 12/2005 | Levy et al. ................... 303/150 |
| 7,171,296 | B2 * | 1/2007 | Kato et al. ..................... 701/70 |
| 2004/0016594 | A1 | 1/2004 | Yasui et al. |
| 2004/0019417 | A1 | 1/2004 | Yasui et al. |
| 2004/0133324 | A1 | 7/2004 | Yasui et al. |
| 2004/0186647 | A1 | 9/2004 | Ono |

FOREIGN PATENT DOCUMENTS

JP    A 2004-249971    9/2004

\* cited by examiner

*Primary Examiner*—Dalena Tran
(74) *Attorney, Agent, or Firm*—Oliff & Berridge, PLC

(57) ABSTRACT

A vehicle control system includes a calculator that calculates an integrated controlled variable including a first controlled variable used for controlling the braking/driving force of each wheel so as to optimize the μ utilization ratio of the wheel and a second controlled variable used for controlling the steering angle of each wheel, based on constraints including a target resultant force to be applied to the vehicle body and a limit friction circle of each wheel, a calculator that calculates a steering controlled variable used for controlling only the steering angle of each wheel so as to achieve the target resultant force, and a controller that controls only the steering angle of each wheel, or the steering angle and braking/driving force of each wheel, based on a controlled variable obtained by linearly interpolating the integrated controlled variable and the steering controlled variable.

19 Claims, 5 Drawing Sheets

VEHICLE MODEL

ROAD SURFACE $\mu = 0.3$, $\rho = 1$

ROAD SURFACE $\mu = 0.6$, $\rho = 0.21$

ROAD SURFACE $\mu = 1.0$, $\rho = 0$

STEERING COORDINATED CONTROL

OPTIMUM DISTRIBUTION CONTROL

VEHICLE CONTROL SYSTEM AND VEHICLE CONTROL METHOD

INCORPORATION BY REFERENCE

The disclosure of Japanese Patent Application No. 2005-87350 filed on Mar. 24, 2005, including the specification, drawings and abstract, is incorporated herein by reference in its entirety.

BACKGROUND OF THE INVENTION

1. Field of the Invention

The invention generally relates to a vehicle control system and a vehicle control method, and more particularly to a vehicle control system and a vehicle control method which provide desired vehicle body force and yaw moment by controlling only the steering angles of the front and rear wheels in a normal region in which an unused grip range is large, thereby to suppress unnecessary braking, and which is able to efficiently perform coordinated control of braking/driving control and steering control in regions, including a limit region in which the unused grip range is small, other than the normal region.

2. Description of Related Art

As a conventional technique for controlling the steering angles and braking/driving forces of all of the four wheels to be controlled, independently of one another, coordinated control for controlling the steering angle and braking/driving force of each wheel in a coordinated fashion as disclosed in Japanese Laid-open Patent Publication No. 2004-249971 is known. This technique is to provide a combination of the tire forces of the four wheels, which is selected from some combinations of the tire forces of the four wheels that achieve the target resultant force applied to the vehicle body and target yaw moment, such that the selected combination minimizes the μ utilization ratio of each wheel (i.e., the ratio of the tire force of each wheel to the maximum value thereof), namely, maximizes an unused grip range of a tire of each wheel. Here, it is to be noted that the μ utilization ratio and the unused grip range have a relationship that "unused grip range=1−μ utilization ratio". A known integrated control logic for controlling the steering angles and braking/driving forces of the four wheels in an integrated fashion provides an algorithm that minimizes the μ utilization ratio of the wheel having the largest μ utilization ratio, out of the four wheels, thereby to achieve the theoretical limits of the vehicle body force and yaw moment in a region in which the tire forces of all of the four wheels are used. Thus, the known technique makes it possible to utilize the tire forces with high efficiency, and greatly contributes to an improvement of the dynamic performance of the vehicle while it is running in a limit region in which the unused tire grip range is important or critically small.

If the algorithm of the known technique is used, the dynamic performance of the vehicle can be effectively controlled in the limit region in which the unused tire grip range is important or critically small, but a steering actuator and a braking/driving actuator comprising a brake actuator and a driving actuator are also operated in a normal region in which the unused grip range is large, as well as in the limit region. The operation of the brake actuator causes the speed of the vehicle to be reduced, and the reduction in the vehicle speed may make the driver uncomfortable in the normal region. If the driving actuator is operated so as to compensate for the reduction of the vehicle speed, the fuel economy or efficiency may undesirably deteriorate.

SUMMARY OF THE INVENTION

It is therefore an object of the invention to provide a vehicle control system and a vehicle control method which achieve desired vehicle body force and yaw moment by controlling only the steering angles of the front and rear wheels in the normal region in which the unused grip range is large, and which continuously varies the integrated control logic for optimally controlling the steering angle and braking/driving force of each wheel in combination, based on the unused grip range, in regions (other than the normal region) including the limit region in which the unused grip range is small.

To accomplish the above and/or other object(s), there is provided according to one aspect of the invention a vehicle control system which comprises: (a) a first controlled variable calculating unit that calculates a first controlled variable used for controlling at least one of the braking force and driving force of each wheel so as to optimize the μ utilization ratio of the wheel, or an integrated controlled variable including the first controlled variable and a second controlled variable used for controlling a steering angle of each wheel, based on constraints including, as parameters, a target resultant force to be applied to the vehicle body so as to achieve a vehicle body motion desired by a driver and the size of a friction circle of each wheel, (b) a second controlled variable calculating unit that calculates a steering controlled variable of each wheel for achieving the target resultant force by controlling only the steering angle of the wheel, and (c) a controller that determines a final controlled variable used for controlling at least one of the steering angle, the braking force and the driving force of each wheel such that a proportion of a controlled variable calculated by at least one of the first controlled variable calculating unit and the second controlled variable calculating unit for controlling the steering angle of each wheel in the final controlled variable is made larger than that of a controlled variable used for controlling at least one of the braking force and the driving force of each wheel in a region in which the μ utilization ratio is small, than those in a region in which the μ utilization ratio is large.

In one embodiment of the above aspect of the invention, the controller controls only the steering angle of each wheel based on the steering controlled variable calculated by the second controlled variable calculating unit in the region in which the μ utilization ratio is small, and controls at least one of the braking force and the driving force of each wheel and the steering angle of each wheel based on the first or integrated controlled variable and the steering controlled variable calculated by the first controlled variable calculating unit and the second controlled variable calculating unit in the region in which the μ utilization ratio is large.

In another embodiment of the above aspect of the invention, the controller controls only the steering angle of each wheel based on the steering controlled variable calculated by the second controlled variable calculating unit in a normal region in which the μ utilization ratio is small, and controls at least one of the braking force and the driving force of each wheel and the steering angle of each wheel based on the integrated controlled variable calculated by the first controlled variable calculating unit in a limit region in which the μ utilization ratio is large. Furthermore, the controller controls at least one of the braking force and the driving force of each wheel and the steering angle of each wheel, based on acoordinated controlled variable obtained by linearly interpolating the steering controlled variable and the integrated controlled variable, in a region between the normal region and the limit region.

In the embodiment as described just above, the steering controlled variable and the integrated controlled variable may be linearly interpolated according to the following equation:

$$C_{ci} = \rho C_{oi} + (1-\rho) C_{si} \quad (5)$$

where $C_{ci}$ is the coordinated controlled variable obtained as a result of linear interpolation, $C_{oi}$ is the integrated controlled variable, $C_{si}$ is the steering controlled variable, and $\rho$ is a parameter that varies from 0 to 1 depending upon the μ utilization ratio in the region ranging from the normal region in which the μ utilization ratio is small to the limit region in which the μ utilization ratio is large.

In the embodiment as described above, only the steering angle of each wheel is controlled based on the steering controlled variable in the normal region in which the unused grip range is large (i.e., the μ utilization ratio is small), and therefore the frequency of the operations of the brake system can be reduced. Also, at least one of the braking force and driving force of each wheel and the steering angle of each wheel are controlled based on the integrated controlled variable in the limit region in which the unused grip range is small (i.e., the μ utilization ratio is large), and at least one of the braking force and driving force of each wheel and the steering angle of each wheel are controlled based on the coordinated controlled variable obtained by linearly interpolating the integrated controlled variable and the steering controlled variable in the region between the normal region and the limit region. Thus, the grip force of a tire of each wheel can be optimally controlled by way of integrated control under which the steering angle and the braking/driving force are continuously and optimally combined based on the unused grip range (or μ utilization ratio).

As explained above, according to the invention, only the steering angles of the front and rear wheels are controlled so as to achieve the target vehicle body force and yaw moment in the region in which the unused grip range is large (i.e., the μ utilization ratio is small), so that unnecessary braking operations can be reduced. Furthermore, the coordinated control of the steering control and the braking/driving control can be efficiently performed in regions (including the limit region in which the unused grip range is small, i.e., the μ utilization ratio is large) other than the normal region.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein.

DETAILED DESCRIPTION OF EXEMPLARY EMBODIMENT

Figure 1:
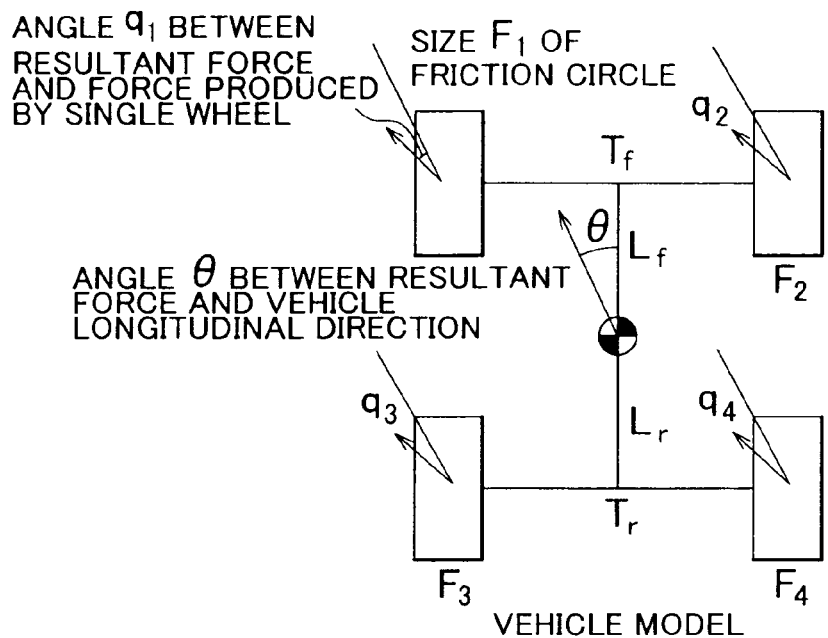
FIG. 1 is a schematic view illustrating a vehicle dynamic model of a four-wheel vehicle.

An exemplary embodiment of the invention will be described in detail with reference to the accompanying drawings. Initially, the principle of the invention will be explained. More specifically, a control logic employed in a normal region in which an unused grip range (which will be described later) is large, a control logic employed in a limit region in which the unused grip range is small, and a control logic employed in a region between the normal region and the limit region will be explained.

The "μ utilization ratio" as mentioned above indicates the degree of utilization of the friction between a tire and the road surface with respect to the maximum frictional force that can be generated between the tire and the road surface, namely, indicates how much of the maximum frictional force is utilized. The "μ utilization ratio" is represented by the ratio of the force generated by a wheel (or tire) to the friction circle (which will be described later) of the wheel. Meanwhile, the unused grip range indicates how much of the grip force or grip range of a tire is unused with respect to the friction circle of the wheel, and has a relationship that "unused grip range"= (1−μ utilization ratio). The unused grip range may also be derived from the self-aligning torque of the wheel.

Initially, a control logic is explained according to which only the steering angle is controlled so as to achieve a target vehicle body force (a target resultant force to be applied to the vehicle body so as to achieve the vehicle-body motion desired by the driver) and a target yaw moment in the normal region in which the unused tire grip range is large. In the normal region in which the unused grip range is large, it is undesirable to cause the control system to apply brakes (i.e., actuate a brake system) in a situation where the driver does not perform a braking operation, since the application of the brakes may make the driver feel uncomfortable, namely, the ride comfort may deteriorate.

To achieve the target vehicle body force and yaw moment without actuating the brake system, it is necessary to control the lateral force of each wheel so as to generate the target vehicle body force and yaw moment. The relationships among the lateral forces $F_{yf}$, $F_{yr}$ of the two front wheels and two rear wheels, lateral force $F_{y0}$ applied to the vehicle body and the yaw moment $M_{z0}$ are expressed by the following equations (1), (2):

$$F_{y0} = F_{yf} + F_{yr} \quad (1)$$

$$M_{z0} = lfF_{yf} - lrF_{yr} \quad (2)$$

where lf is distance between the front axle and the center of gravity, and lr is distance between the rear axle and the center of gravity.

The above equations (1), (2) are solved in terms of the lateral forces of the two front wheels and two rear wheels to produce the following equations (3), (4):

$$F_{yf} = \frac{l_r F_{y0} + M_{z0}}{l_f + l_r} \quad (3)$$

-continued $$F_{yr} = \frac{l_r F_{y0} - M_{z0}}{l_f + l_r} \quad (4)$$

Assuming that the lateral forces of the right and left wheels having an equal slip angle are proportional to the load applied to each wheel, the lateral force of each wheel is expressed as follows:

$$F_{ys1} = \frac{F_{z1}}{F_{z1} + F_{z2}} \cdot \frac{l_r F_{y0} + M_{z0}}{l_f + l_r} \quad (5)$$

$$F_{ys2} = \frac{F_{z2}}{F_{z1} + F_{z2}} \cdot \frac{l_f F_{y0} + M_{z0}}{l_f + l_r} \quad (6)$$

$$F_{ys3} = \frac{F_{z3}}{F_{z3} + F_{z4}} \cdot \frac{l_r F_{y0} - M_{z0}}{l_f + l_r} \quad (7)$$

$$F_{ys4} = \frac{F_{z4}}{F_{z3} + F_{z4}} \cdot \frac{l_f F_{y0} - M_{z0}}{l_f + l_r} \quad (8)$$

where $F_{ysi}$ is lateral force of each wheel (left front wheel when $i=1$, right front wheel when $i=2$, left rear wheel when $i=3$, right rear wheel when $i=4$), and $F_{zi}$ is load applied to each wheel.

In the control mode in which only the steering angle is controlled, therefore, the steering angle of each of the wheels may be controlled by using the lateral force of each wheel as indicated by Eq. (5)-(8) as a steering controlled variable, so as to provide a slip angle that produces the lateral force of Eq. (5)-(8) in each wheel.

The lateral force of each wheel as a steering controlled variable computed as described above for control of the steering angle only and the longitudinal force ($F_{xsi}=0$) of each wheel satisfy constraints expressed by the following equations (9)-(11):

$$\sum_{i=1}^{4} F_{xsi} = F_{x0} \quad (9)$$

$$\sum_{i=1}^{4} F_{ysi} = F_{y0} \quad (10)$$

$$-\frac{T_f}{2}(F_{xs1} - F_{xs2}) - \frac{T_r}{2}(F_{xs3} - F_{xs4}) + \quad (11)$$
$$l_f(F_{ys1} + F_{ys2}) - l_r(F_{ys3} + F_{ys4}) = M_{z0}$$

where $T_f$ is front-wheel tread, and $T_r$ is rear-wheel tread.

Next, a steering and braking/driving integrated control logic will be explained according to which the steering angle and the braking/driving force are controlled in combination or in an integrated manner in the limit region in which the unused grip range is small.

FIG. 1 illustrates a four-wheel vehicle dynamic model in which the direction θ of the force (resultant force) applied to the vehicle body as the resultant of forces generated by tires at the respective four wheels in order to achieve the vehicle motion desired by the driver, and the size (radius) $F_i$ of the friction circle of each wheel are known. The direction θ is expressed as an angle formed between the vector of the resultant force and the longitudinal direction of the vehicle. This vehicle model is used to obtain the direction of the force generated by a tire of each wheel for providing the maximum resultant force, namely, for maximizing the acceleration (or deceleration) generated in the vehicle body, while ensuring the target yaw moment. The direction of the tire force of each wheel is represented by angle $q_i$ formed between the direction of the resultant force applied to the vehicle body and the direction of the force generated by a single wheel (i.e., the force generated by a tire of each wheel).

The friction circle of each wheel is a circle that represents a limit at which the tire of the wheel permits control of the dynamic performance of the vehicle without losing its grip, and the size of the friction circle represents the maximum value of the frictional force generated between the wheel (i.e., tire) and the road surface. The friction circle can be obtained based on an estimated or hypothetical value of μ (coefficient of friction) of each wheel and the load applied to each wheel. The tire frictional force is the resultant of the force (driving force or braking force) applied to the tire in the traveling direction and the frictional force applied to the tire in the lateral direction (the right or left direction). When the frictional force applied in either one of the traveling and lateral directions makes up 100%, namely, when the magnitude of the frictional force coincides with the size of the friction circle, the frictional force applied in the other direction becomes equal to zero. It is to be noted that the direction of the braking force is opposite to that of the driving force. The range of the frictional force as heretofore described can be generally expressed in the form of a circle in a vector diagram, and is therefore called "friction circle".

Figure 2:
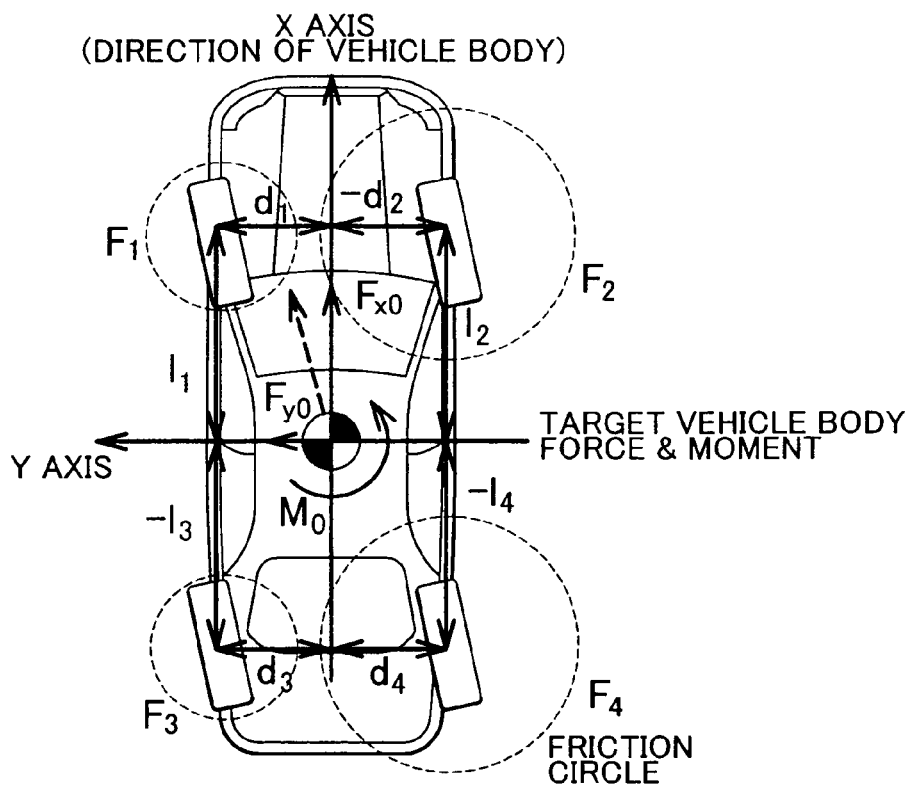
FIG. 2 is a schematic view illustrating a coordinate system that is oriented in accordance with the resultant force generated in the four-wheel vehicle dynamic model of FIG. 1.

To simplify the description of the control logic, replacement of symbols is carried out as shown in FIG. 2. Assuming that the size Fi of the limit friction circle of each wheel (i.e., left front wheel when $i=1$, right front wheel when $i=2$, left rear wheel when $i=3$, right rear wheel when $i=4$) is known, as shown in FIG. 2, the direction of the force generated by a tire of each wheel (which is represented by angle $q_i$ formed between the X axis and the force generated by a single wheel) is determined so as to uniformly maximize the unused grip range of each wheel while achieving the desired yaw moment $M_{z0}$ and vehicle body force (longitudinal force $F_{x0}$, lateral force $F_{y0}$).

In order to obtain the direction of the tire force of each wheel, a model for the constraints or conditions that the desired yaw moment and vehicle body resultant force are to be achieved is initially constructed. If the conversion of the coordinates is carried out, as shown in FIG. 2, such that the x axis extends in the direction of the resultant force generated and the y axis extends in the direction perpendicular to the direction of the resultant force, the position (x, y)=($l_i$, $d_i$) of each tire can be described as follows:

$$l_1 = L_f \quad (12)$$

$$l_2 = L_f \quad (13)$$

$$l_3 = -L_r \quad (14)$$

$$l_4 = -L_r \quad (15)$$

$$d_1 = \frac{T_f}{2} \quad (16)$$

$$d_2 = -\frac{T_f}{2} \quad (17)$$

$$d_3 = \frac{T_r}{2} \tag{18}$$

$$d_4 = -\frac{T_r}{2} \tag{19}$$

Also, the direction $q_i$ (the counterclockwise direction with respect to the X axis is regarded as the positive direction) of the force generated by each wheel is subject to the following constraints expressed by Eqs. (20)-(22) where $\gamma$ represents the $\mu$ utilization ratio of each wheel.

$$\gamma \sum_{i=1}^{4} F_i \cos q_i = F_{x0} \tag{20}$$

$$\gamma \sum_{i=1}^{4} F_i \sin q_i = F_{y0} \tag{21}$$

$$\gamma \sum_{i=1}^{4} F_i (-d_i \cos q_i + l_i \sin q_i) = M_{z0} \tag{22}$$

Here, eliminating $\gamma$ from Eqs. (20), (22) yields $$\sum_{i=1}^{4} F_i \{(-F_{x0}d_i - M_{z0})\cos q_i + F_{x0}l_i \sin q_i\} = 0 \tag{23}$$

Similarly, eliminating $\gamma$ from Eqs. (21), (22) yields $$\sum_{i=1}^{4} F_i \{-F_{y0}d_i \cos q_i + (F_{y0}l_i - M_{z0})\sin q_i\} = 0 \tag{24}$$

Then, the following equation (25) is defined as an evaluation function that is to be maximized.

$$J = \frac{(d_0 F_{x0})^2 + (l_0 F_{y0})^2 + M_{x0}^2}{\gamma} \tag{25}$$

where $d_0$ and $l_0$ are constants for coordinating the dimensions of the force and the moment, and are defined as follows:

$$d_0 = \frac{T_f + T_r}{4} \tag{26}$$

$$l_0 = \frac{L_f + L_r}{2} \tag{27}$$

Substituting Eqs. (20)-(22) into Eq. (25) yields $$J = d_0^2 F_{x0} \sum_{i=1}^{4} F_i \cos q_i + l_0^2 F_{y0} \sum_{i=1}^{4} F_i \sin q_i + \tag{28}$$

$$M_{z0} \sum_{i=1}^{4} F_i (-d_i \cos q_i + l_i \sin q_i)$$

$$= \sum_{i=1}^{4} F_i \{(d_0^2 F_{x0} - d_i M_{z0})\cos q_i + (l_0^2 F_{y0} + l_i M_{z0})\sin q_i\}$$

Since the numerator of the right side of Eq. (25) is a constant, $\gamma$ is eventually minimized if $q_i$ that maximizes Eq. (28) is found. Thus, the following problem 1 is formulated as a non-linear optimization problem.

Problem 1: Obtain $q_i$ that maximizes Eq. (28) while satisfying the constraints of Eqs. (23), (24).

In this embodiment, the non-linear optimization problem is solved by using an algorithm of successive quadratic programming. Initially, $\sin q_i$ and $\cos q_i$ are linearly approximated as $$\sin q_i = \sin q_{i0} + \cos q_{i0}(q_i - q_{i0}) \tag{29}$$

$$\cos q_i = \cos q_{i0} - \sin q_{i0}(q_i - q_{i0}) \tag{30}$$

so that the constraints of Eqs. (23), (24) are linearized as in the following equations (31), (32):

$$\sum_{i=1}^{4} F_i \{(F_{x0}d_i + M_{z0})\sin q_{i0} + F_{x0}l_i \cos q_{i0}\}q_i = \tag{31}$$

$$\sum_{i=1}^{4} F_i \{(F_{x0}d_i + M_{z0})(q_{i0}\sin q_{i0} + \cos q_{i0}) + F_{x0}l_i(q_{i0}\cos q_{i0} - \sin q_{i0})\}$$

$$\sum_{i=1}^{4} F_i \{F_{y0}d_i \sin q_{i0} + (F_{y0}l_i - M_{z0})\cos q_{i0}\}q_i = \tag{32}$$

$$\sum_{i=1}^{4} F_i \{F_{y0}d_i(q_{i0}\sin q_{i0} + \cos q_{i0}) + (F_{y0}l_i - M_{z0})(q_{i0}\cos q_{i0} - \sin q_{i0})\}$$

Also, if $\sin q_i$ and $\cos q_i$ are approximated according to the quadratic Taylor expansion as $$\sin q_i = \sin q_{i0} + \cos q_{i0}(q_i - q_{i0}) - \frac{\sin q_{i0}}{2}(q_i - q_{i0})^2 \tag{33}$$

$$\cos q_i = \cos q_{i0} - \sin q_{i0}(q_i - q_{i0}) - \frac{\cos q_{i0}}{2}(q_i - q_{i0})^2 \tag{34}$$

the evaluation function of Eq. (28) is described as $$J = \sum_{i=1}^{4} F_i \left[ -\frac{1}{2}\{(d_0^2 F_{x0} - d_i M_{z0})\cos q_{i0} + (l_0^2 F_{y0} + l_i M_{z0})\sin q_{i0}\}q_i^2 + \right. \tag{35}$$

$$\{(d_0^2 F_{x0} - d_i M_{z0})(q_{i0}\cos q_{i0} - \sin q_{i0}) +$$

$$(l_0^2 F_{y0} + l_i M_{z0})(q_{i0}\sin q_{i0} + \cos q_{i0})\}q_i +$$

$$(d_0^2 F_{x0} - d_i M_{z0})\left\{\left(1 - \frac{q_{i0}^2}{2}\right)\cos q_{i0} + q_{i0}\sin q_{i0}\right\} +$$

$$\left. (l_0^2 F_{y0} + l_i M_{z0})\left\{\left(1 - \frac{q_{i0}^2}{2}\right)\sin q_{i0} - q_{i0}\cos q_{i0}\right\} \right] =$$

-continued $$\sum_{i=1}^{4} F_i \left\{ -\frac{1}{2} X_{Di}(q_i - X_i)^2 + Y_i \right\}$$

where, $$X_i = \frac{X_{Ni}}{X_{Di}} \quad (36)$$

$$X_{Ni} = (d_0^2 F_{x0} - d_i M_{z0})(q_{i0}\cos q_{i0} - \sin q_{i0}) + \quad (37)$$
$$(l_0^2 F_{y0} + l_i M_{z0})(q_{i0}\sin q_{i0} + \cos q_{i0})$$

$$X_{Di} = (d_0^2 F_{x0} - d_i M_{z0})\cos q_{i0} + (l_0^2 F_{y0} + l_i M_{z0})\sin q_{i0} \quad (38)$$

$$Y_i = (d_0^2 F_{x0} - d_i M_{z0})\left\{\left(1 - \frac{q_{i0}^2}{2}\right)\cos q_{i0} + q_{i0}\sin q_{i0}\right\} + \quad (39)$$
$$(l_0^2 F_{y0} + l_i M_{z0})\left\{\left(1 - \frac{q_{i0}^2}{2}\right)\sin q_{i0} - q_{i0}\cos q_{i0}\right\} + \frac{X_{Ni}^2}{2X_{Di}}$$

By converting variables such that $$p_i = \sqrt{F_i X_{Di}}(q_i - X_i) \quad (40)$$

the evaluation function is written as $$J = \sum_{i=1}^{4}\left(-\frac{1}{2}p_i^2 + F_i Y_i\right) = -\frac{1}{2}\|p\|^2 + \sum_{i=1}^{4} F_i Y_i \quad (41)$$

where, $$p=[p_1 p_2 p_3 p_4]^T$$

Thus, the evaluation function is converted into the Euclidean-norm minimization problem for p.

Also, the constraints that have been linearly approximated are described as $$\begin{bmatrix} A_{11} & A_{12} & A_{13} & A_{14} \\ A_{21} & A_{22} & A_{23} & A_{24} \end{bmatrix} p = \begin{bmatrix} B_1 \\ B_2 \end{bmatrix} \quad (42)$$

where, $$A_{1i} = \sqrt{\frac{F_i}{X_{Di}}} \cdot \{(F_{x0}d_i + M_{z0})\sin q_{i0} + F_{x0}l_i\cos q_{i0}\} \quad (43)$$

$$A_{2i} = \sqrt{\frac{F_i}{X_{Di}}} \cdot \{F_{y0}d_i\sin q_{i0} + (F_{y0}l_i - M_{z0})\cos q_{i0}\} \quad (44)$$

$$B_1 = \sum_{i=1}^{4} F_i[(F_{x0}d_i + M_{z0})\{(q_{i0} - X_i)\sin q_{i0} + \cos q_{i0}\} + \quad (45)$$
$$F_{x0}l_i\{(q_{i0} - X_i)\cos q_{i0} - \sin q_{i0}\}]$$

$$B_2 = \sum_{i=1}^{4} F_i[F_{y0}d_i\{(q_{i0} - X_i)\sin q_{i0} + \cos q_{i0}\} + \quad (46)$$
$$(F_{y0}l_i - M_{z0})\{(q_{i0} - X_i)\cos q_{i0} - \sin q_{i0}\}]$$

The Euclidean-norm minimum solution that satisfies Eq. (42) is $$p = \begin{bmatrix} A_{11} & A_{12} & A_{13} & A_{14} \\ A_{21} & A_{22} & A_{23} & A_{24} \end{bmatrix}^+ \cdot \begin{bmatrix} B_1 \\ B_2 \end{bmatrix} \quad (47)$$

where $A^+$ is the pseudo-inverse of matrix A. Where A is a full-rank matrix having more columns than rows, the pseudo-inverse of A is calculated as $$A^+ = (A \cdot A^T)^{-1} A^T \quad (48)$$

Finally, the relationship as expressed by Eq. (49) is obtained:

$$q = diag\left[\frac{1}{\sqrt{F_1 X_{D1}}} \quad \frac{1}{\sqrt{F_2 X_{D2}}} \quad \frac{1}{\sqrt{F_3 X_{D3}}} \quad \frac{1}{\sqrt{F_4 X_{D4}}}\right] \cdot \quad (49)$$

$$\begin{bmatrix} A_{11} & A_{12} & A_{13} & A_{14} \\ A_{21} & A_{22} & A_{23} & A_{24} \end{bmatrix}^+ \cdot \begin{bmatrix} B_1 \\ B_2 \end{bmatrix} + \begin{bmatrix} X_1 \\ X_2 \\ X_3 \\ X_4 \end{bmatrix}$$

where $$q = [q_1 q_2 q_3 q_4]^T$$

According to the algorithm of the successive quadratic programming, convergent calculations are carried out by a recursive method in which calculations of Eqs. (36)-(38), (43)-(46) and (49) are carried out again by using $q_i$ derived from Eq. (49). Using Eqs. (25), (28), the μ utilization ratio for the case where $q_i$ derived from this algorithm is used is calculated as $$\gamma = \frac{(d_0 F_{x0})^2 + (l_0 F_{y0})^2 + M_{z0}^2}{\sum_{i=1}^{4} F_i\{(d_0^2 F_{x0} - d_i M_{z0})\cos q_i + (l_0^2 F_{y0} + l_i M_{z0})\sin q_i\}} \quad (50)$$

Finally, the longitudinal and lateral forces of each wheel calculated from the direction of the tire force generated at each wheel and the μ utilization ratio under the steering and braking/driving integrated control are derived as $$F_{xoi} = \gamma F_i \cos q_i \quad (51)$$

$$F_{yoi} = \gamma F_i \sin q_i \quad (52)$$

The steering and braking/driving integrated control logic, if explained with reference to the coordinate system used for explaining the control of the steering angle only, is designed so as to uniformly minimize the μ utilization ratio of each wheel by using the friction circle of each wheel while satisfying the constraints as expressed by the following equations:

$$\sum_{i=1}^{4} F_{xoi} = F_{x0} \quad (53)$$

$$\sum_{i=1}^{4} F_{yoi} = F_{y0} \quad (54)$$

$$-\frac{T_f}{2}(F_{xo1} - F_{xo2}) - \frac{T_r}{2}(F_{xo3} - F_{xo4}) +$$
$$1_f(F_{yo1} - F_{yo2}) - 1_f(F_{yo3} - F_{yo4}) = M_{z0} \quad (55)$$

where $F_{xoi}$ is the longitudinal force of each wheel obtained according to the steering and braking/driving integrated control logic, $F_{yoi}$ is the lateral force of each wheel obtained according to the steering and braking/driving integrated control logic, $F_{x0}$ is the target longitudinal force applied to the vehicle body, and $F_{y0}$ is the target lateral force applied to the vehicle body. The target vehicle-body longitudinal force $F_x$ and the target vehicle-body lateral force $F_y$ are obtained by calculating an x-axis component and a y-axis component of the target resultant force to be applied to the vehicle body so as to achieve the vehicle body motion desired by the driver, in an x-y coordinate system in which the center of gravity of the vehicle lies on the origin and the x axis extends in the longitudinal direction of the vehicle.

The control logics as described above are coordinated depending upon the unused grip range in the region between the normal region and the limit region. In this case, too, it is necessary to satisfy the constraints explained above with respect to the control logic for the normal region and the control logic for the limit region. In this embodiment, parameter $\rho$ for coordinating the control logic for control of the steering angle only with the steering and braking/driving integrated control logic as explained above is defined as follows:

$$\rho = \begin{cases} 0 & (0 \leq \gamma < 0.3) \\ \dfrac{\gamma - 0.3}{0.6} & (0.3 \leq \gamma < 0.9) \\ 1 & (0.9 \leq \gamma \leq 1) \end{cases} \quad (56)$$

where $\gamma$ is $\mu$ utilization ratio obtained when the optimum control is performed. While parameter $\rho$ is calculated based on the $\mu$ utilization ratio obtained when the optimum control is performed in the above equation (56), parameter $\rho$ may also be represented by the following equation (57), using the maximum value $\max\gamma_{si}$ of the $\mu$ utilization ratio $\gamma_{si}$ of each wheel obtained in the control of the steering angle only.

$$\rho = \begin{cases} 0 & (0 \leq \max\gamma_{si} < 0.3) \\ \dfrac{\max\gamma_{si} - 0.3}{0.6} & (0.3 \leq \max\gamma_{si} < 0.9) \\ 1 & (0.9 \leq \max\gamma_{si} \leq 1) \end{cases} \quad (57)$$

where $\max\gamma_{si} \approx \max |F_{ysi}|(F_{zi} \cdot \mu)$.

Then, a coordinating control logic is defined by linearly interpolating the integrated controlled variables obtained according to the steering and braking/driving integrated control logic and the steering controlled variables obtained according to the control logic for control of the steering angle only as indicated by the following equations (58), (59), using the parameter $\rho$ as defined above.

$$F_{xci} = \rho \cdot F_{xoi} + (1-\rho)F_{xsi} \quad (58)$$

$$F_{yci} = \rho \cdot F_{yoi} + (1-\rho)F_{ysi} \quad (59)$$

where $F_{xci}$ is target value of the longitudinal force of each wheel after coordination, and $F_{yci}$ is target value of the lateral force of each wheel after coordination. The coordinating control logic as indicated above satisfies the following constraints:

$$\begin{aligned}
\sum_{i=1}^{4} F_{xci} &= \sum_{i=1}^{4} (\rho \cdot F_{xoi} + (1-\rho)F_{xsi}) \\
&= \rho \sum_{i=1}^{4} F_{xoi} + (1-\rho) \sum_{i=t}^{4} F_{xsi} \\
&= \rho \cdot F_x + (1-\rho)F_x \\
&= F_x
\end{aligned} \quad (60)$$

$$\begin{aligned}
\sum_{i=1}^{4} F_{yci} &= \sum_{i=1}^{4} (\rho \cdot F_{yoi} + (1-\rho)F_{ysi}) \\
&= \rho \sum_{i=1}^{4} F_{yoi} + (1-\rho) \sum_{i=t}^{4} F_{ysi} \\
&= \rho \cdot F_y + (1-\rho)F_y \\
&= F_y
\end{aligned} \quad (61)$$

-continued $$-\frac{T_f}{2}(F_{xc1} - F_{xc2}) - \frac{T_r}{2}(F_{xc3} - F_{xc4}) + \qquad (62)$$
$$l_f(F_{yc1} + F_{yc2}) - l_f(F_{yc3} + F_{yc4})$$
$$= -\frac{T_f}{2}(\rho \cdot F_{xo1} + (1-\rho)F_{xs1} - \rho \cdot F_{xo2} -$$
$$(1-\rho)F_{xs2} - \frac{T_r}{2}(\rho \cdot F_{xo3} + (1-\rho)$$
$$F_{xs3} - \rho \cdot F_{xo4} - (1-\rho)F_{xs4} + 1_f$$
$$(\rho \cdot F_{yo1} + (1-\rho)F_{ys1} + \rho \cdot F_{yo2} + (1-\rho)$$
$$F_{ys2} - 1_r(\rho \cdot F_{yo3} + (1-\rho)F_{ys3} + \rho \cdot F_{yo4} + (1-\rho)F_{ys4}$$
$$= \rho\left\{-\frac{T_f}{2}(F_{xo1} - F_{xo2}) - \frac{T_r}{2}(F_{xo3} - F_{xo4}) +\right.$$
$$\left. 1_i(F_{yo1} + F_{yo2}) - 1_r(F_{yo3} - F_{yo4})\right\} + (1-\rho)$$
$$\left\{-\frac{T_f}{2}(F_{xs1} - F_{xs2}) - \frac{T_r}{2}(F_{xs3} - F_{xs4}) +\right.$$
$$\left. 1_f(F_{ys1} + F_{ys2}) - 1_r(F_{ys3} + F_{ys4})\right\}$$

Figure 3:
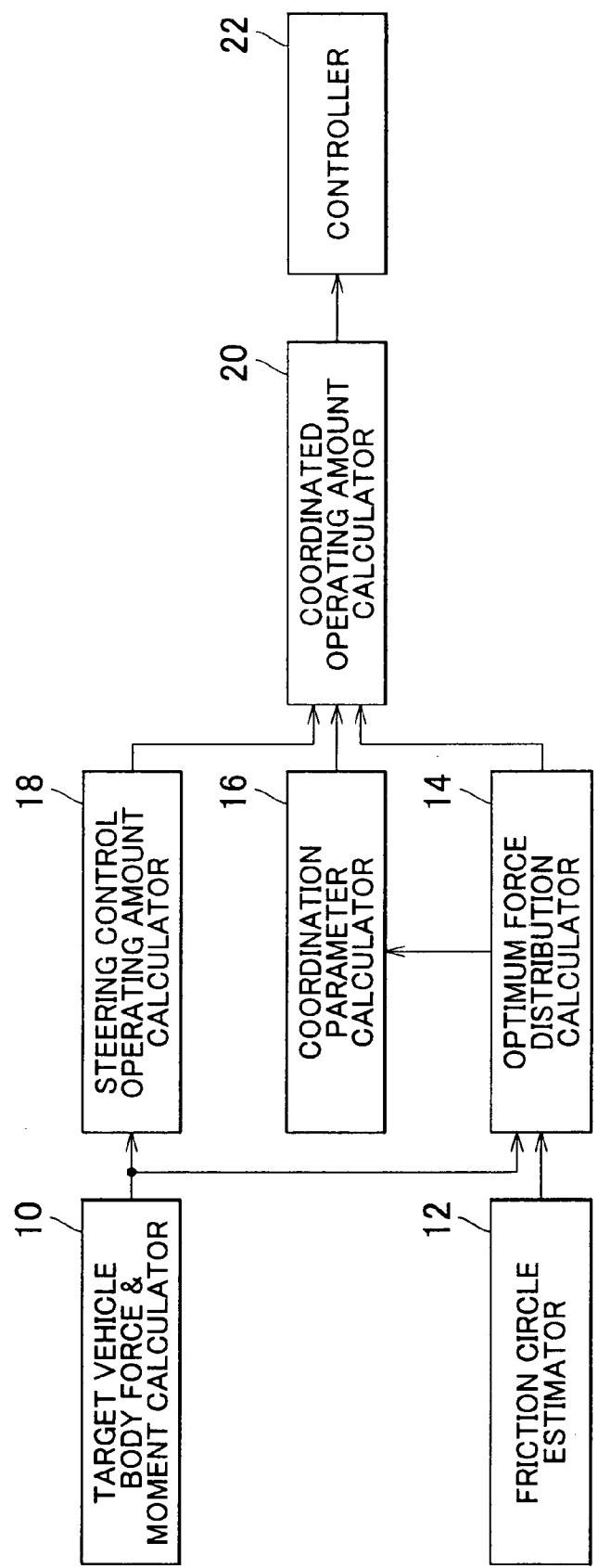
FIG. 3 is a block diagram illustrating an exemplary embodiment of the invention.

Next, a control system as an exemplary embodiment of the invention for obtaining the forces as expressed by Eq. (58) and Eq. (59) by using the integrated controlled variables and steering controlled variables will be described in detail with reference to FIG. 3 through FIG. 5. As shown in FIG. 3, the control system of this embodiment includes a target vehicle body force and moment calculator 10 for calculating the magnitude and direction of the resultant force applied to the vehicle body and the yaw moment so as to achieve the vehicle body motion desired by the driver, a friction circle estimator 12 for estimating the size of the friction circle of each wheel, and an optimum force distribution calculator 14 for distributing the resultant force such that the force generated at each wheel is optimized, for example, the force used with respect to the friction circle is minimized, based on the magnitude and direction of the target resultant force and the size of the friction circle of each wheel.

To the optimum force distribution calculator 14 is connected a coordination parameter calculator 16 for calculating the coordination parameter p. To the target vehicle body force and moment calculator 10 is connected a steering control operating amount calculator 18 for calculating control operating amounts (steering controlled variables) for achieving the vehicle body motion desired by the driver by way of control of the steering angle only.

The optimum force distribution calculator 14, coordination parameter calculator 16 and the steering control operating amount calculator 18 are connected to a coordinated operating amount calculator 20, and the coordinated operating amount calculator 20 is connected to a controller 22 including braking and driving actuators and steering actuators.

The target vehicle body force and moment calculator 10 calculates target magnitude and direction of the resultant force applied to the vehicle body and a target yaw moment, based on driver's operation amounts representing driving operations performed by the driver and the vehicle speed, so as to achieve the vehicle body motion desired by the driver. The target magnitude and direction of the vehicle-body resultant force and target yaw moment may also be calculated based on differences between the target vehicle operating conditions (including, for example, the yaw velocity, vehicle-body slip angle, vehicle-body slip angular velocity and so forth) set in accordance with the driver's operation amounts and actually measured values or estimated values of these conditions, so that the differences approach zero. Here, the driver's operation amounts may include the steering angle of the steering wheel, the amount of operation of the accelerator pedal (i.e., a stroke of the accelerator pedal, force with which the accelerator pedal is depressed, an accelerator pedal position, or the like), and the amount of operation of the brake pedal (i.e., a stroke of the brake pedal, a pedal effort or force with which the brake pedal is depressed, a master cylinder pressure, or the like).

The friction circle estimator 12 estimates the size of the friction circle for each of the wheels, based on the self-aligning torque (SAT) of the wheel and/or the wheel speed or movements.

The optimum force distribution calculator 14 calculates the magnitude and direction of the optimum force generated by a tire of each wheel, which force is determined so as to uniformly minimize the µ utilization ratio for each wheel, and the thus minimized pt utilization ratio γ of each wheel, based on the target magnitude and direction of the vehicle-body resultant force, target yaw moment and the radius of the friction circle.

The coordination parameter calculator 16 calculates the coordination parameter ρ according to the above-indicated equation (56), based on the µ utilization ratio γ obtained by the optimum force distribution calculator 14.

The steering control operating amount calculator 18 calculates the lateral force of each wheel (which may be called "steering controlled variable") based on the lateral component of the vehicle-body resultant force (i.e., lateral force applied to the vehicle) and yaw moment calculated by the target vehicle body force and moment calculator 10, so that the lateral forces of the wheels thus calculated achieve the target vehicle lateral force and yaw moment only by control of the steering system, namely, only by control of the lateral force of each wheel.

The coordinated operating amount calculator 20 calculates coordinated controlled variables by linearly interpolating the steering controlled variables (longitudinal force $F_{sci}=0$ and lateral force $F_{ysi}$) calculated by the steering control operating amount calculator 18 and the longitudinal force $F_{xoi}$ and lateral force $F_{yoi}$ obtained from the magnitude and direction of the optimum tire force of each wheel calculated by the optimum force distribution calculator 14, based on the coordination parameter ρ calculated by the coordination parameter calculator 16. The linear interpolation is carried out by using the above-indicated equations (58) and (59).

The controller 22 controls the steering actuators and the braking and driving actuators as needed so as to control the steering angle of each wheel or the steering angle and braking/driving force of each wheel, which is/are required for achieving the target tire force of each wheel.

The controller 22 may include a braking force controller, a driving force controller, a front-wheel steering controller and a rear-wheel steering controller.

The braking force controller may be in the form of, for example, a control device used for ESC (Electronic Stability Control), namely, a control device that individually controls the braking forces of the respective wheels independently of the driver's operations, a control device (so-called brake-by-wire) that is mechanically isolated from the driver's operations and controls the braking force of each wheel as desired via signal lines, or the like.

The driving force controller may be the form of, for example, a control device that controls the driving force by controlling the engine torque through control of at least one of the throttle opening, the ignition timing and the amount of fuel injected, a control device that controls the driving force by controlling the shifting positions or points of the transmission, a control device that controls the driving force of at least one of the longitudinal and lateral directions by controlling torque transfer, or the like.

The front-wheel steering controller may be in the form of, for example, a control device that controls the steering angles of the front wheels in accordance with the operations of the steering wheel by the driver, a control device (so-called steer-by-wire) that is mechanically isolated from the driver's operations and controls the steering angles of the front wheels independently of the operations of the steering wheel by the driver, or the like.

The rear-wheel steering controller may be in the form of, for example, a control device that controls the steering angles of the rear wheels in accordance with the operations of the steering wheel by the driver, a control device that is mechanically isolated from the driver's operations and controls the steering angles of the rear wheels independently of the operations of the steering wheel by the driver, or the like.

Figure 4A:
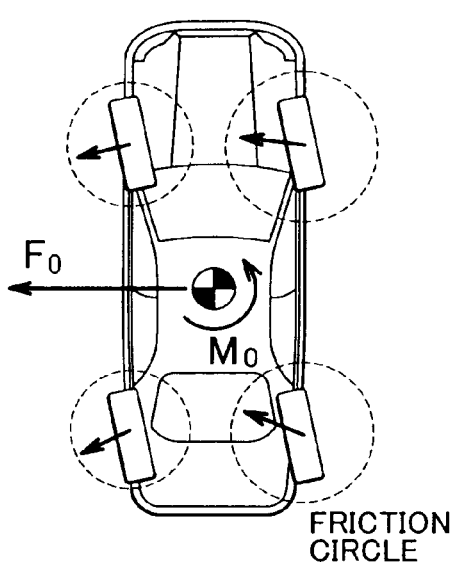
FIGS. 4A to 4C show a view showing the operation results of the force and moment distribution algorithm employed in the embodiment of FIG. 3.
Figure 4B:
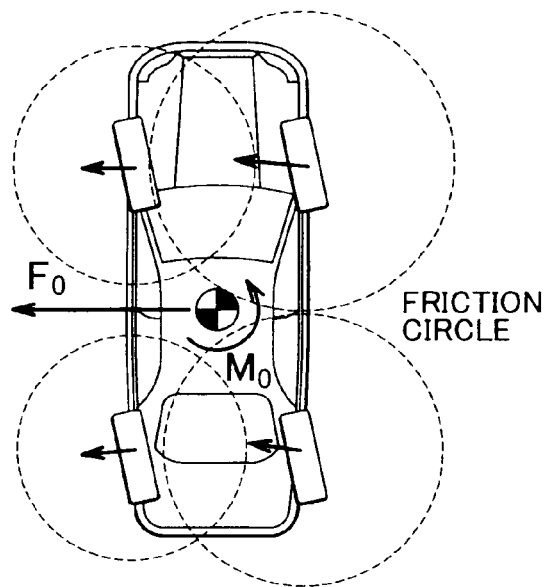
Figure 4C:
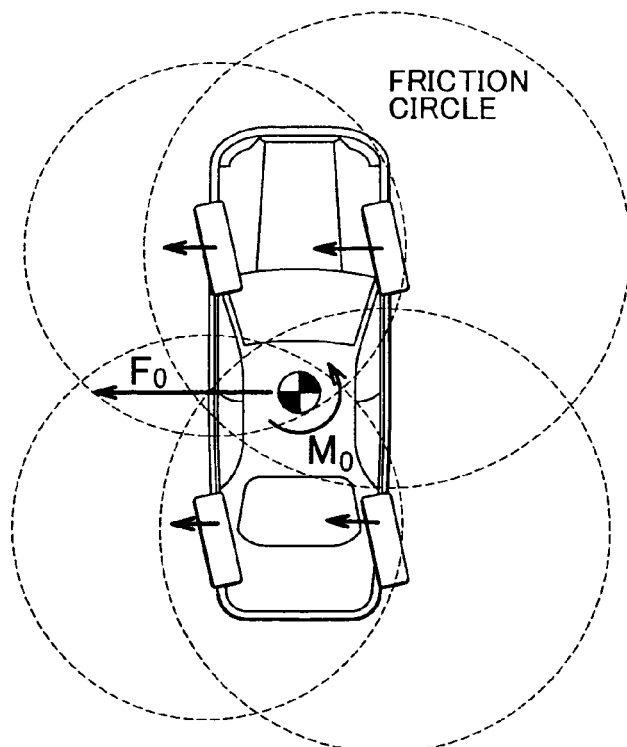

To confirm the effect of this embodiment, reference is now made to FIG. 4 showing the operation results of the force and moment distribution algorithm for the case where the target vehicle body force (vehicle lateral force)=4000 N and the target yaw moment=1000 Nm. FIG. 4, in which the sizes of the friction circles with varying μ of the road surface are shown, illustrates how the method of coordination of this embodiment is adapted for coordinating the control of the steering system only with the steering and braking/driving integrated control (or optimum force distribution control), depending upon the unused grip range.

More specifically, in the case of (a) where μ of the road surface is equal to 0.3 and the unused grip range is small, ρ is set to 1 (ρ=1) and calculations are performed according to the steering and braking/driving integrated control logic (or optimum distribution control logic). In the case of (c) where μ of the road surface is equal to 1.0 and the unused grip range is large, ρ is set to 0, and the control of the steering system only is performed in which the tire forces of all of the four wheels are generated in the lateral direction. In the case of (b) where μ of the road surface is equal to 0.6, ρ is set to 0.21, and coordinated control between the controls for the cases of (a) and (c) is performed, namely, the control of the steering angle is coordinated with only a small degree of the braking/driving control.

Figure 5A:
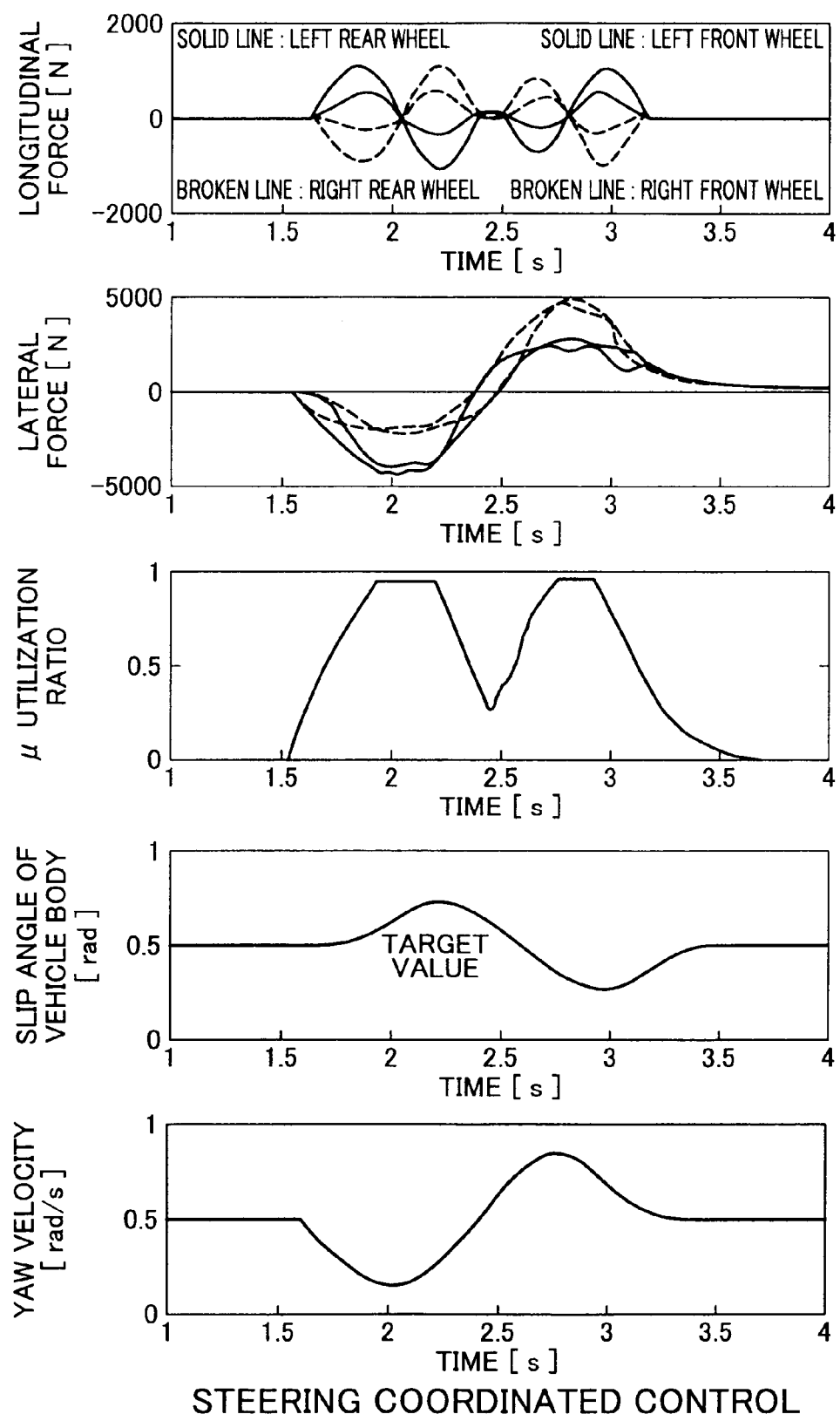
FIGS. 5A and 5B show a view showing the results of simulation of the tire forces generated under the optimum distribution control and the steering coordinated control of the embodiment of FIG. 3.
Figure 5B:
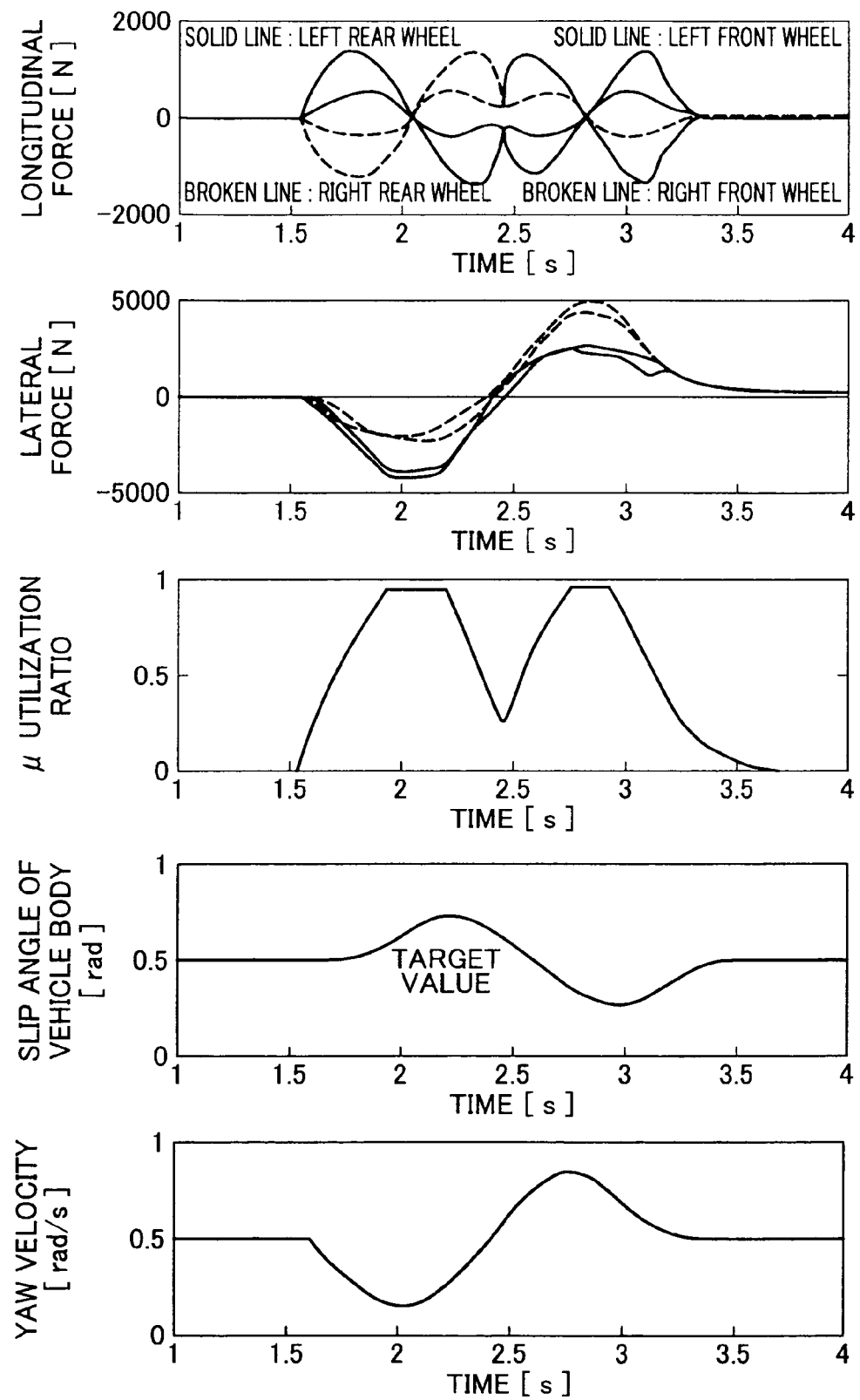

FIG. 5 shows the tire forces generated by respective tires, which forces are obtained through simulation under the optimum distribution control and the steering coordinated control of this embodiment when steering of one period of a 60-degree sinusoidal waveform is performed while the vehicle is running at a speed of 80 km/h on a road surface having μ=0.95. It will be understood that, under the steering coordinated control of (a) in FIG. 5, the braking/driving force becomes equal to zero in the initial period of steering and during returning of the steering wheel, namely, when the μ utilization ratio (calculated when the optimum distribution control is performed) is equal to or less than 0.3.

Thus, according to the illustrated embodiment, the control method can be continuously varied from the optimum distribution control for improvement of the performance at the limit of tire grip to the control of the steering system only, depending upon the unused grip range (or μ utilization ratio), by linearly interpolating the controlled variables derived from the control of the steering system only and the controlled variables derived from the steering and braking/driving integrated control (or optimum distribution control).

What is claimed is:

1. A vehicle control system comprising:
a first controlled variable calculating unit that calculates (1) first controlled variable used for controlling at least one of a braking force and a driving force of each wheel so as to optimize a μ utilization ratio of said each wheel so as to minimize the μ utilization ratio of a force applied to a vehicle body as a result of forces generated by tires at said each wheel, or that calculates (2) an integrated controlled variable including the first controlled variable and a second controlled variable used for controlling a steering angle of said each wheel, based on constraints including, as parameters, a target resultant force to be applied to the vehicle body so as to achieve a vehicle body motion desired by a driver and a size of a friction circle of said each wheel;
a second controlled variable calculating unit that calculates a steering controlled variable of each wheel for achieving the target resultant force by controlling only the steering angle of said each wheel; and
a controller that determines a final controlled variable, used for controlling at least one of the steering angle, the braking force and the driving force of said each wheel, such that in a region in which the μ utilization ratio is small, a controlled variable for controlling the steering angle of said each wheel in the final control variable, calculated by at least one of the first controlled variable calculating unit and the second controlled variable calculating unit, is made larger than a controlled variable used for controlling at least one of the braking force and the driving force of said each wheel in the final controlled variable.

2. The vehicle control system as defined in claim 1, wherein the controller controls only the steering angle of said each wheel based on the steering controlled variable calculated by the second controlled variable calculating unit in the region in which the μ utilization ratio is small, and controls at least one of the braking force and the driving force of said each wheel and the steering angle of said each wheel based on the first or integrated controlled variable and the steering controlled variable calculated by the first controlled variable calculating unit and the second controlled variable calculating unit in the region in which the μ utilization ratio is large.

3. The vehicle control system as defined in claim 2, wherein the controller controls only the steering angle of said each wheel based on the steering controlled variable calculated by the second controlled variable calculating unit in a normal region in which the μ utilization ratio is small, and controls at least one of the braking force and the driving force of said each wheel and the steering angle of said each wheel based on the integrated controlled variable calculated by the first controlled variable calculating unit in a limit region in which the µ utilization ratio is large, and wherein the controller controls at least one of the braking force and the driving force of said each wheel and the steering angle of said each wheel, based on a coordinated controlled variable obtained by linearly interpolating the steering controlled variable and the integrated controlled variable, in a region between the normal region and the limit region.

4. The vehicle control system as defined in claim 3, wherein the steering controlled variable and the integrated controlled variable are linearly interpolated according to the following equation:

$C_{ci}=\rho C_{oi}+(1-\rho)C_{si}$ where $C_{ci}$ is the coordinated controlled variable obtained as a result of linear interpolation, $C_{oi}$ is the integrated controlled variable, $C_{si}$ is the steering controlled variable, and $\rho$ is a parameter that varies from 0 to 1 depending upon the µ utilization ratio in the region ranging from the normal region in which the µ utilization ratio is small to the limit region in which the µ utilization ratio is large.

5. The vehicle control system as defined in claim 1, wherein the controller controls only the steering angle of said each wheel based on the steering controlled variable calculated by the second controlled variable calculating unit in a normal region in which the µ utilization ratio is small, and controls at least one of the braking force and the driving force of said each wheel and the steering angle of said each wheel based on the integrated controlled variable calculated by the first controlled variable calculating unit in a limit region in which the µ utilization ratio is large, and wherein the controller controls at least one of the braking force and the driving force of said each wheel and the steering angle of said each wheel, based on a coordinated controlled variable obtained by linearly interpolating the steering controlled variable and the integrated controlled variable, in a region between the normal region and the limit region.

6. The vehicle control system as defined in claim 5, wherein the steering controlled variable and the integrated controlled variable are linearly interpolated according to the following equation:

$C_{ci}=\rho C_{oi}+(1-\rho)C_{si}$ where $C_{ci}$ is the coordinated controlled variable obtained as a result of linear interpolation, $C_{oi}$ is the integrated controlled variable, $C_{si}$ is the steering controlled variable, and $\rho$ is a parameter that varies from 0 to 1 depending upon the µ utilization ratio in the region ranging from the normal region in which the µ utilization ratio is small to the limit region in which the µ utilization ratio is large.

7. The vehicle control system as defined in claim 1, wherein the µ utilization ratio indicates a degree of utilization of friction between the wheel and a road surface with respect to a maximum frictional force that can be generated between the wheel and the road surface and the µ utilization ratio is represented by a ratio of a force generated by the wheel to the friction circle of the wheel.

8. A vehicle control system comprising:
a first controlled variable calculating unit that calculates (1) a first controlled variable used for controlling at least one of a braking force and a driving force of each wheel so as to optimize a µ utilization ratio of said each wheel so as to minimize the µ utilization ratio of a force applied to a vehicle body as a result of forces generated by tires at said each wheel, or that calculates (2) an integrated controlled variable including the first controlled variable and a second controlled variable used for controlling a steering angle of said each wheel, based on constraints including, as parameters, a target resultant force to be applied to the vehicle body so as to achieve a vehicle body motion desired by a driver and a size of a friction circle of said each wheel;

a second controlled variable calculating unit that calculates a steering controlled variable of each wheel for achieving the target resultant force by controlling only the steering angle of said each wheel; and a controller that determines a final controlled variable, used for controlling at least one of the steering angle, the braking force and the driving force of said each wheel, such that, in a region in which the µ utilization ratio is small, a sum of the second controlled variable and the steering controlled variable, calculated by at least one of the first controlled variable calculating unit and the second controlled variable calculating unit, for controlling the steering angle of said each wheel in the final controlled variable is made larger than the first controlled variable used for controlling at least one of the braking force and the driving force of said each wheel in the final controlled variable.

9. The vehicle control system as defined in claim 8, wherein the µ utilization ratio indicates a degree of utilization of friction between the wheel and a road surface with respect to a maximum frictional force that can be generated between the wheel and the road surface and the µ utilization ratio is represented by a ratio of a force generated by the wheel to the friction circle of the wheel.

10. A method of controlling a motor vehicle, comprising:
calculating a first controlled variable used for controlling at least one of a braking force and a driving force of each wheel so as to optimize a µ utilization ratio of said each wheel so as to minimize the µ utilization ratio of a force applied to a vehicle body as a result of forces generated by tires at said each wheel, or calculating an integrated controlled variable including the first controlled variable and a second controlled variable used for controlling a steering angle of said each wheel, based on constraints including, as parameters, a target resultant force to be applied to the vehicle body so as to achieve a vehicle body motion desired by a driver and a size of a friction circle of said each wheel;

calculating a steering controlled variable of each wheel for achieving the target resultant force by controlling only the steering angle of said each wheel; and determining a final controlled variable, used for controlling at least one of the steering angle, the braking force and the driving force of said each wheel, such that in a region in which the µ utilization ratio is small a controlled variable used for controlling the steering angle of said each wheel in the final controlled variable is made larger than a controlled variable used for controlling at least one of the braking force and the driving force of said each wheel in the final controlled variable.

11. The method as defined in claim 10, wherein only the steering angle of said each wheel is controlled based on the steering controlled variable in the region in which the µ utilization ratio is small, and at least one of the braking force and the driving force of said each wheel and the steering angle of said each wheel are controlled based on the first or integrated controlled variable and the steering controlled variable in the region in which the μ utilization ratio is large.

12. The method as defined in claim 11, wherein only the steering angle of said each wheel is controlled based on the steering controlled variable in a normal region in which the μ utilization ratio is small, and at least one of the braking force and the driving force of said each wheel and the steering angle of said each wheel are controlled based on the integrated controlled variable in a limit region in which the μ utilization ratio is large, and wherein at least one of the braking force and the driving force of said each wheel and the steering angle of said each wheel are controlled based on a coordinated controlled variable obtained by linearly interpolating the steering controlled variable and the integrated controlled variable, in a region between the normal region and the limit region.

13. The method as defined in claim 12, wherein the steering controlled variable and the integrated controlled variable are linearly interpolated according to the following equation:

$$C_{ci} = \rho C_{oi} + (1-\rho) C_{si}$$

where $C_{ci}$ is the coordinated controlled variable obtained as a result of linear interpolation, $C_{oi}$ is the integrated controlled variable, $C_{si}$ is the steering controlled variable, and ρ is a parameter that varies from 0 to 1 depending upon the μ utilization ratio in the region ranging from the normal region in which the μ utilization ratio is small to the limit region in which the μ utilization ratio is large.

14. The method as defined in claim 10, wherein only the steering angle of said each wheel is controlled based on the steering controlled variable in a normal region in which the μ utilization ratio is small, and at least one of the braking force and the driving force of said each wheel and the steering angle of said each wheel are controlled based on the integrated controlled variable in a limit region in which the μ utilization ratio is large, and wherein at least one of the braking force and the driving force of said each wheel and the steering angle of said each wheel are controlled based on a coordinated controlled variable obtained by linearly interpolating the steering controlled variable and the integrated controlled variable, in a region between the normal region and the limit region.

15. The method as defined in claim 14, wherein the steering controlled variable and the integrated controlled variable are linearly interpolated according to the following equation:

$$C_{ci} = \rho C_{oi} + (1-\rho) C_{si}$$

where $C_{ci}$ is the coordinated controlled variable obtained as a result of linear interpolation, $C_{oi}$ is the integrated controlled variable, $C_{si}$ is the steering controlled variable, and ρ is a parameter that varies from 0 to 1 depending upon the μ utilization ratio in the region ranging from the normal region in which the μ utilization ratio is small to the limit region in which the μ utilization ratio is large.

16. The method as defined in claim 10, wherein the μ utilization ratio indicates a degree of utilization of friction between the wheel and a road surface with respect to a maximum frictional force that can be generated between the wheel and the road surface and the μ utilization ratio is represented by a ratio of a force generated by the wheel to the friction circle of the wheel.

17. A vehicle control system comprising:

a first controlled variable calculating unit that calculates (1) a first controlled variable used for controlling at least one of a braking force and a driving force of each wheel so as to uniformly minimize a μ utilization ratio of each wheel, or that calculates (2) an integrated controlled variable including the first controlled variable and a second controlled variable used for controlling a steering angle of each wheel, based on constraints including, as parameters, a target resultant force to be applied to the vehicle so as to achieve a vehicle motion desired by a driver and a size of a friction circle of each wheel;

a second controlled variable calculating unit that calculates a steering controlled variable of each wheel for achieving the target resultant force by controlling only the steering angle of each wheel; and a controller that determines a final controlled variable, used for controlling at least one of the steering angle, the braking force and the driving force of each wheel, such that in a region in which the μ utilization ratio is small, a controlled variable for controlling the steering angle of each wheel in the final controlled variable, calculated by at least one of the first controlled variable calculating unit and the second controlled variable calculating unit, is made larger than a controlled variable used for controlling at least one of the braking force and the driving force of each wheel in the final controlled variable.

18. A vehicle control system comprising:

a first controlled variable calculating unit that calculates (1) a first controlled variable used for controlling at least one of a braking force and a driving force of each wheel so as to uniformly minimize a μ utilization ratio of each wheel, or that calculates (2) an integrated controlled variable including the first controlled variable and a second controlled variable used for controlling a steering angle of each wheel, based on constraints including, as parameters, a target resultant force to be applied to the vehicle so as to achieve a vehicle motion desired by a driver and a size of a friction circle of each wheel;

a second controlled variable calculating unit that calculates a steering controlled variable of each wheel for achieving the target resultant force by controlling only the steering angle of each wheel; and a controller that determines a final controlled variable, used for controlling at least one of the steering angle, the braking force and the driving force of each wheel, such that in a region in which the μ utilization ratio is small a sum of the second controlled variable and the steering controlled variable, calculated by at least one of the first controlled variable calculating unit and the second controlled variable calculating unit, for controlling the steering angle of each wheel in the final controlled variable is made larger than the first controlled variable used for controlling at least one of the braking force and the driving force of each wheel in the final controlled variable.

19. A method of controlling a motor vehicle, comprising:

calculating a first controlled variable used for controlling at least one of a braking force and a driving force of each wheel so as to uniformly minimize a μ utilization ratio of each wheel, or calculating an integrated controlled variable including the first controlled variable and a second controlled variable used for controlling a steering angle of each wheel, based on constraints including, as parameters, a target resultant force to be applied to the vehicle so as to achieve a vehicle motion desired by a driver and a size of a friction circle of each wheel;

calculating a steering controlled variable of each wheel for achieving the target resultant force by controlling only the steering angle of each wheel; and determining a final controlled variable, used for controlling at least one of the steering angle, the braking force and the driving force of each wheel, such that in a region in which the µ utilization ratio is small a controlled variable used for controlling the steering angle of each wheel in the final controlled variable is made larger than a controlled variable used for controlling at least one of the braking force and the driving force of each wheel in the final controlled variable.

* * * * *